July 5, 1932.  C. J. FUTTER ET AL  1,865,625

RUBBER SOLE CONSTRUCTION

Filed June 2, 1928

Inventors
George W. Blair
and Charles J. Futter
By Eugene M. Giles
Attorney

Patented July 5, 1932

1,865,625

UNITED STATES PATENT OFFICE

CHARLES J. FUTTER AND GEORGE W. BLAIR, OF MISHAWAKA, INDIANA, ASSIGNORS TO MISHAWAKA RUBBER AND WOOLEN MANUFACTURING COMPANY, OF MISHAWAKA, INDIANA, A CORPORATION OF INDIANA

RUBBER SOLE CONSTRUCTION

Application filed June 2, 1928. Serial No. 282,456.

Our invention relates to rubber sole shoes and has reference more particularly to the sole structure and the building up, fastening together and combining of the parts thereof in a manner whereby soles of crepe and other rubber of a somewhat softer character than that usually employed for soles on leather shoes, may be satisfactorily attached to the shoe.

In the manufacture of certain types of shoes, it is desirable to use soles of vulcanized slightly compounded crepe rubber, on account of its unique knurled appearance, its light weight, its resiliency, and also because of its wear resisting properties, but such soles cannot be attached satisfactorily with the present methods, particularly to shoes having the upper made of leather. The crepe rubber, on account of its rough surface and somewhat soft character, is not well adapted for attachment by mechanical means, and leather is easily damaged by the usual vulcanization processes, and it has been a serious problem therefore in handling this type of sole on leather shoes to get a sure attachment of the sole by mechanical means or to avoid ruining the leather upper in an attempt to vulcanize the sole to the shoe.

With rubber soles and heels of the character ordinarily used on leather shoes, it is the practice to vulcanize the sole and heel before attachment to the shoe, using a compound which makes the sole and heel somewhat hard and stiff and sufficiently tough so that they may be securely attached to the shoe by mechanical means. This method of attachment can be employed with soles and heels of crepe rubber, but as above indicated, rubber of this sort does not lend itself to convenient and dependable attachment by the usual mechanical means of attachment employed with ordinary rubber soles, and moreover in the making of the vulcanized soles and heels, and in their attachment to the shoe, a considerable quantity of cured scrap rubber is accumulated, and as vulcanized crepe rubber scrap in this form can be used only in certain places, it makes the method expensive and undesirable.

Unvulcanized crepe can also be used for the soles and heels of leather shoes and attached to them by cementing processes, but this also is not satisfactory, as the crepe soles oftentimes come loose and, moreover, the unvulcanized crepe keeps stretching and gets out of shape.

With our invention, the above mentioned difficulties encountered heretofore in making shoes with soles and heels of crepe rubber have been entirely overcome, and a vulcanized sole and heel is provided without any accumulation of cured scrap rubber and consequent loss. Moreover the sole and heel are firmly united with and permanently attached to the shoe by both mechanical means and vulcanization.

The principal objects of our invention are to provide an improved rubber sole construction; to insure a thorough bonding together of the parts composing the sole and a permanent attachment thereof to the upper; to apply a sole of crepe or other rubber of a somewhat soft character in a satisfactory manner to a leather shoe; to vulcanize the sole on the shoe; and to avoid injury to the leather in vulcanizing the rubber sole thereon.

Figure 1:
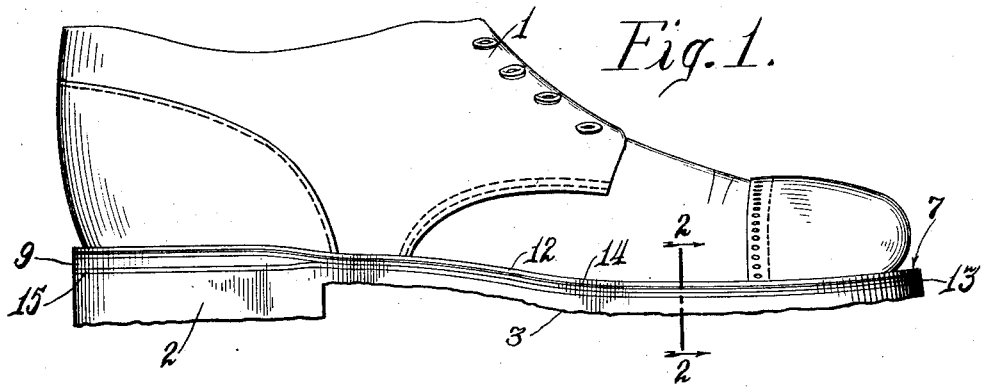
Fig. 1 is a side view of the lower portion of a shoe having a rubber sole attached thereto in accordance with our invention.
Figure 2:
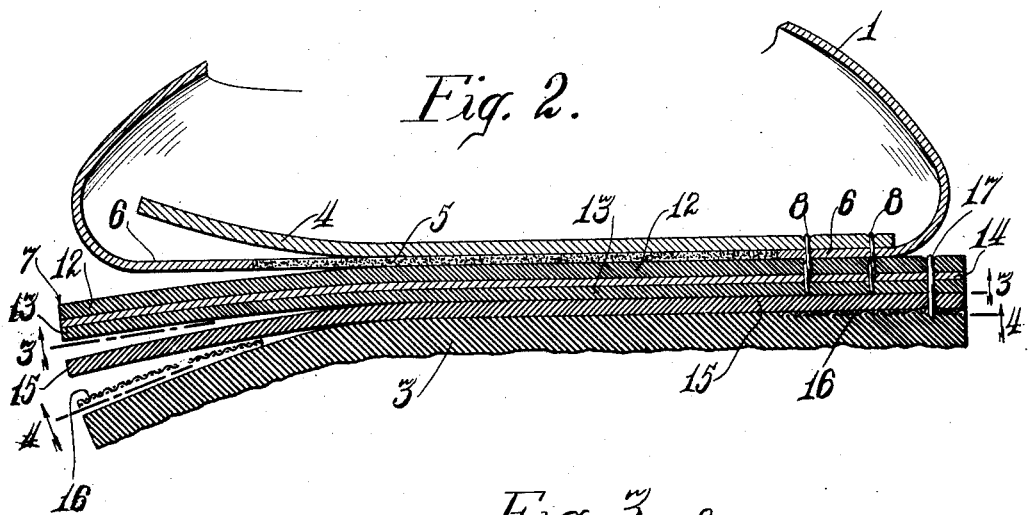
Fig. 2 is an enlarged sectional view on the line 2—2 of Fig. 1, with the sole parts separated at one side.

Our invention is designed particularly to afford a satisfactory construction of a leather upper with crepe rubber sole, and such structure is shown and described, although the invention is not necessarily limited thereto. The reference numeral 1 indicates the leather upper and 2 and 3 the heel and forward portions respectively of the crepe rubber sole which is secured to the upper by intermediate layers of materials as follows:

The leather upper 1 is lasted over and secured to an insole 4 in the usual manner, and the surface then leveled off by applying a filler 5 in the depression or space bounded by the inturned edge 6 of the upper. Next a middle or slip sole 7 is applied, the bottom of the shoe and the upper surface of the middle sole being first cemented and then the two cemented surfaces pressed together, after which said middle sole is further secured to the shoe by one or more rows 8 of Littleway lock stitches which engage through the middle sole 7, inturned edge 6 of the upper and inner sole 4.

Figure 3:
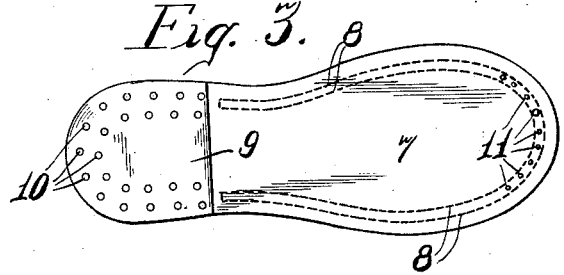
Fig. 3 is a bottom view of the partially assembled shoe sole.
Figure 4:
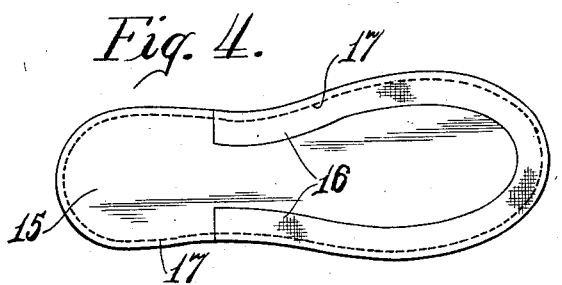
Fig. 4 is a similar view of the shoe sole before the final or outer sole layer is applied.

It is very essential that the heel structure be held securely to the shoe, and as it is impractical to consider sewing through the thickness of the heel, the lines of stitches 8 are terminated at the heel as shown in Fig. 3. Nails would pull through rubber or fabric that might be used, and therefore a piece of leather 9 is used and laid over the heel portion of the middle sole 7 and together with the latter is secured to the shoe by a number of nails 10, the said heel plate 9 being buffed on the outer surface so that the next layer will adhere securely thereto. A number of nails 11 are also preferably applied around the toe of the shoe to increase the security of attachment of the middle sole at this point.

The middle or slip sole 7 is preferably a laminated structure, consisting of a thin layer 14 of leather vulcanized between two layers 12 and 13 of rubber or rubber compounds, the leather being incorporated in the structure for the purpose of preventing stretching of the middle sole and for the added purpose of affording an unfailing anchorage for the stitches In the middle sole which we use, the upper layer 12 is made of a heavily compounded rubber to give stiffness to the middle sole which is essential in a construction of this sort, while the bottom layer 13 is of compounded crepe rubber milled with a smooth surface. The thin laminations are put in a press and partially vulcanized under pressure so as to bond the leather layer 14 firmly between the two layers of rubber prior to assembling in the shoe. It is essential that the bottom layer 13 is only very slightly vulcanized in the press, otherwise it would not be possible to get the adjacent layers of compounded crepe to vulcanize with it into a homogeneous mass when the whole shoe is put through the vulcanizing process.

After the middle sole 7 and heel plate 9 are secured in place, the layer 15, which is an important element of this sole construction, is applied. This layer consists of raw compounded crepe which has been milled with fairly smooth surfaces so as to permit a good bond between it and the laminations of the sole adjoining it. The exposed surface of the crepe lamination 13 of the middle sole and the upper surface of the layer 15 are buffed to roughen the surface and are softened by rubbing them with a rubber solvent such as gasoline, and then a coating of pure crepe cement is applied to both surfaces and also to the exposed surface of the heel plate 9. The crepe layer 15 is then stuck onto the under side of the middle sole 7 and heel plate 9 and rolled into tight contact therewith, after which a fabric strip 16, which has previously been frictioned with rubber, is laid around the outer edge of the exposed surface of the layer 15 and rolled into firm contact therewith, to afford an anchorage for a row of Goodyear lock stitches 17, which are passed through the edges of the middle sole 7, layer 15 and strip 16 and extend around the heel. This part of the construction may be modified if desired, by using a piece of frictioned fabric which covers the entire surface of the layer 15 instead of using merely the strip 16 around the edge. This fabric strip 16, or the said entire surface covering is important for the reason that if there were no fabric or equivalent material to which to anchor the stitches 17, the tension of the stitches would cut badly into the crepe sole and either pull through or cut the rubber so badly that it would be apt to break off.

After the layer 15 and strip 16, or complete covering as above suggested, have been secured in place and stitched, the crepe sole 3 and heel 2 are then applied. These parts consist of raw compounded crepe rubber having the knurled crepe surface on the outside and smooth surface on the inside. The exposed surface of the layer 15 and strip 16 and the upper or smooth surfaces of the sole 3 and heel 2 are first prepared by washing with gasoline and coating with cement, after which the sole and heel are stuck in place and firmly rolled so as to get a good contact with the rest of the structure, after which the structure is subjected to vulcanization. Thus any scrap rubber obtained in preparing the shoe sole remains uncured and can be reworked without loss.

The crepe rubber which we contemplate in this application, is not loaded with mineral compounds but has just enough vulcanizing material in it to vulcanize it and make it stay fixed. There is one exception to this and that is the upper part 12 of the slip sole, which is a heavily compounded stock made especially to give the desired stiffness to the slip sole. The rubber itself might be from either one of the plantation varieties or the wild varieties. The crepe or knurled surface is only desired on the exposed outer surface of the sole. The inner laminations and the inner sides of the outer sole 3 and heel 2 are milled with smooth surfaces so as to get a better bond. The quality of the rubber, however, is preferably the same throughout the different laminations, with the exception of the upper layer 12 of the slip sole which as above indicated, is made of a special heavily compounded stock.

In vulcanizing the rubber sole on the leather upper, we have found that the usual vulcanizing processes cannot safely be employed and special precautions must be taken with reference to the condition of the leather to avoid injury thereto. If there is any moisture present during vulcanization, it will vaporize into steam and cook the life out of the leather. Therefore all the leather used in the construction is thoroughly dried and kept dry before the shoe goes into the vulcanizer. Moreover dry vulcanization is employed to avoid moisture, and in order to further safeguard the leather against injury, the rubber used in the construction is specially compounded, in a manner known to those versed in rubber compounding, so as to vulcanize at a low temperature, for example approximately 215 degrees Fahrenheit, as dry heat of this temperature does not injure leather.

With this construction, and the special precautions to prevent injury of the leather, a sole of crepe rubber may be securely and permanently attached to the shoe in a highly satisfactory manner and without wastage due to accumulation of cured scrap crepe rubber. Moreover the use of a middle sole of the character above described not only provides a secure anchorage for the stitches but also affords ample stiffness for the sole and prevents stretching, while the attachment of the layer 15 to the under side of the middle sole 7 protects the stitches against moisture. Furthermore the outer crepe sole 3 and heel 2 are securely and permanently fastened to the shoe without any exposed fastening means to mar the appearance of the sole, and these outer sole parts thoroughly protect the stitches 17 against abrasive wear.

While we have shown and described our invention in a preferred form, we are aware that various changes and modifications may be made without departing from the principles of our invention, the scope of which is to be determined by the appended claims.

We claim as our invention:

1. In a shoe, the combintion of an insole, a middle sole comprising a layer of fibrous material, an upper lasted between edge portions of the insole and middle sole, fastening means engaged through and connecting the middle sole, the lasted portion of the upper and the inner sole, a layer of rubber adhesively secured to the under side of the middle sole and covering said fastening means, other fastening means engaged through and connecting said layer of rubber and the middle sole, and a rubber sole vulcanized to the under side of said layer of rubber and covering the latter fastening means.

2. In a shoe, the combination of an insole, an upper lasted over the edge of the insole, a middle sole of fibrous material with an attached facing of rubber on the under side, said middle sole being secured directly to the lasted portion of the upper by fastening means engaged through the middle sole, the lasted portion of the upper and the insole, a rubber layer vulcanized to the facing of rubber on the under side of the middle sole, fastening means engaged through and connecting the rubber layer and middle sole, and an outer sole vulcanized to the rubber layer.

3. In a shoe, the combination of an insole, a middle sole of leather with an attached facing of rubber on the under side, an upper lasted between and stitched to the insole and middle sole, a layer of rubber next to said facing and an outer sole next to said layer of rubber, all vulcanized into a unitary mass.

4. In a shoe, the combination of an insole, a middle sole comprising a layer of leather with an attached facing of rubber on the under side, an upper lasted between and stitched to the insole and middle sole, a layer of rubber stitched to the middle sole, and an outer rubber sole vulcanized to the said layer of rubber.

5. In a shoe, the combination of an insole, a middle sole of leather with an attached facing of rubber on the under side, an upper lasted between and stitched to the insole and middle sole, a layer of rubber and an edge reinforcing member stitched to the middle sole, and an outer rubber sole vulcanized to said layer of rubber.

6. In a shoe, the combination of an insole, a middle sole comprising two layers of rubber with a layer of reinforcing therebetween, an upper lasted between and stitched to the insole and middle sole, a layer of rubber vulcanized to the middle sole, a reinforcing on the under side of said layer of rubber and stitched through the latter to the middle sole, and an outer sole vulcanized to the said layer of rubber and the reinforcing thereon.

7. In a shoe, the combination of an insole, a middle sole, an upper having the lower edge thereof interposed between the insole and middle sole, fastening means for securing the said edge of the upper between the insole and middle sole, a layer of rubber vulcanized to the middle sole, a reinforcing on the under side of the said layer of rubber, fastening means inserted through the said reinforcing and the layer of rubber and engaging the middle sole, and an outer sole of rubber vulcanized to the said layer of rubber.

8. In a shoe, the combination of an insole, a middle sole, an upper having the lower edge secured between the insole and middle sole, a layer of rubber on the under side of the middle sole, a heel plate interposed between the heel portions of the middle sole and the layer of rubber, fastening means securing the middle sole and heel plate to the upper and insole, other fastening means securing the said layer of rubber to the middle sole and heel plate, and an outer sole of rubber vulcanized to the said layer of rubber.

9. In a shoe, the combination of an insole, a middle sole comprising a layer of fibrous reinforcing with a facing of crepe rubber secured to the under side, an upper lasted between the insole and middle sole, fastening means engaged through and connecting the middle sole, the lasted portion of the upper and the inner sole and holding the middle sole directly against the lasted portion of the upper, and another sole of crepe rubber vulcanized to the crepe rubber facing of the middle sole.

10. In a shoe, the combination of an insole, a middle sole comprising a layer of fibrous reinforcing with a facing of crepe rubber secured to the under side, an upper lasted between and secured to the insole and middle sole, a layer of crepe rubber adhesively united with the facing of crepe rubber of the middle sole and having a reinforced edge secured by stitches to the middle sole, and an outer sole of crepe rubber vulcanized to said layer of crepe rubber.

11. In a shoe, the combination of an insole, a middle sole comprising a layer of fibrous reinforcing with a facing of crepe rubber secured to the under side, an upper lasted between and secured to the insole and middle sole, an outer sole of crepe rubber, and a connecting layer of crepe rubber between the outer sole and middle sole, stitched to the middle sole and vulcanized to the outer sole and to the crepe rubber facing of the middle sole.

12. In a shoe, the combination of an insole, a middle sole comprising a layer of fibrous reinforcing secured between a stiffening layer of heavily compounded rubber and a layer of crepe rubber, an upper lasted between and secured to the insole and middle sole, a two-piece crepe rubber sole vulcanized to the aforesaid layer of crepe rubber and having a reinforced edge and concealed fastenings engaging said reinforced edge and securing the two-piece crepe rubber sole to the middle sole.

13. The method of making a shoe which comprises stitching the lower edge of the upper between an insole and a middle sole, then stitching a layer of rubber to the middle sole, then applying an outer sole, and then simultaneously vulcanizing said layer of rubber to the middle sole and the outer sole.

14. The method of making a shoe with a leather upper and a rubber sole, which comprises lasting and securing the upper between an insole and a middle sole having a rubber facing of crepe rubber on the under side, then applying a layer of crepe rubber to the said facing and stitching the said layer to the middle sole with a protecting member for preventing the stitches pulling through the said layer of crepe rubber, then applying an outer sole of crepe rubber to the said layer of crepe rubber, and then subjecting the entire shoe to dry vulcanization.

CHARLES J. FUTTER.
GEORGE W. BLAIR.